Oct. 13, 1964  C. E. ANTHONY ETAL  3,153,162

DYNAMOELECTRIC MACHINE

Filed May 23, 1962

INVENTORS
Charles E. Anthony &
James W. French
BY
ATTORNEY 3,153,162
DYNAMOELECTRIC MACHINE
Charles Edward Anthony, Trafford, and James W. French, Gibsonia, Pa., assignors to Westinghouse Electric Corporation, East Pittsburgh, Pa., a corporation of Pennsylvania
Filed May 23, 1962, Ser. No. 196,946
3 Claims. (Cl. 310—211)

The present invention relates to improvements in dynamoelectric machines and, more particularly, to an improved rotor construction for squirrel cage induction motors.

In applications requiring operation of squirrel cage induction motors under high temperature conditions, bending and damaging of the rotor bars becomes a serious problem due to the large difference in the coefficient of thermal expansion between the copper bars and the steel rotor core. This is particularly serious in canned motor applications where the rotor bars must be tight in the slots. The difference in radial expansion between the rotor end rings of copper or other suitable conducting material and the steel rotor core must be taken up in the short length of bar between the ring and the core. This often results in a very high bending stress in the bar. If this length could be increased, the stress would be reduced proportionally. Reducing this stress provides a means for extending present rotor designs to higher temperature applications.

The principal object of the present invention is to provide an improved rotor construction for a squirrel cage dynamoelectric machine whereby a substantial amount of the bending stress in the rotor bars due to radial expansion of the rotor end rings relative to the core is relieved.

Another object of the invention is to provide an improved method for producing a rotor for dynamoelectric machine of the squirrel cage type in which clearance is provided for radial expansion of the squirrel cage bars.

A further object of the invention is to provide an improved rotor for a dynamoelectric machine which is economical to manufacture and which provides clearance of the rotor bars in their slots for taking up the difference in radial expansion between the end ring of the rotor bar cage and the core.

Figure 1:
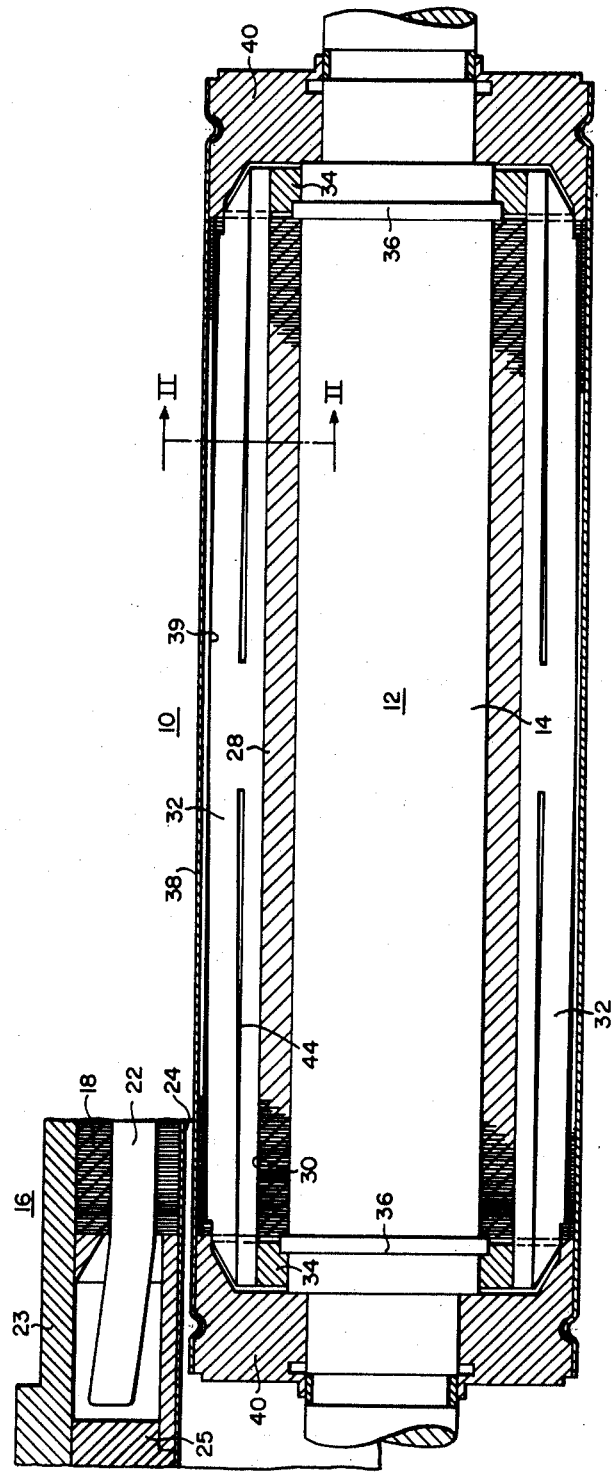
Figure 2:
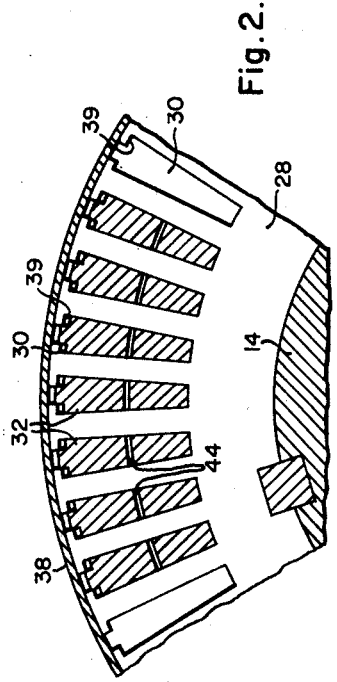

Other objects and advantages of the invention will be apparent from the following detailed description taken in conjunction with the accompanying drawing, in which:

FIGURE 1 is a partial side elevational view of a motor embodying the rotor of this invention, partly in section; and FIG. 2 is a fragmentary transverse sectional view of the rotor, approximately on the line II—II of FIG. 1.

The invention is illustrated as embodied in a canned motor which includes a canned rotor and canned stator. The motor shown is an alternating current motor of the squirrel cage type. The rotor is of usual squirrel cage design which comprises a laminated core and a plurality of conductive bars in partially closed slots on the periphery of the rotor core. The rotor bars are connected to an end ring at each end to provide a closed circuit rotor winding. To overcome the stresses due to the difference in radial expansion of the core with respect to the end ring when the motor is operating under high temperature conditions, clearance is provided between the closed portion at the upper end of the slot and the rotor bar to permit expansion for a substantial distance along the rotor bar. To obtain this clearance, a transverse slot is provided at each end of each rotor bar. The slot extends from the end of the bar to a point near the center. Each bar is compressed to close the slot at the connection to the end ring whereby a tapered clearance is provided between the upper side of the bar and the slot. Although the invention is illustrated as embodied in a canned motor it will be understood, of course, that this invention may be employed in any type squirrel cage induction motor.

As shown in the drawings, the squirrel cage alternating current motor 10 embodying the present invention comprises a cylindrical rotor 12 mounted on a shaft 14 positioned for rotation within a stator 16 a portion of which is shown in FIG. 1. The stator may be of any suitable construction and may include a laminated stator core 18 having slots on its inner periphery for receiving a stator winding 22. Since the particular motor shown is especially adapted for application in pumping operations where fluid is admitted to the interior of the motor the stator 16 is shown as being enclosed by a rigid metal casing or shell 23 extending endwise beyond both ends of the stator and having end closures 25 rigidly secured thereto. The interior of the stator 16 must be sealed to prevent liquid from gaining access between the laminations and into the windings. To accomplish this a relatively thin metal cylinder or liner 24 is inserted into the stator and connected to the end closures 25 to seal the stator windings. This is known as a canned motor construction. The cylinder 24 lies in abutting relation to the inner periphery of the stator core 18 and defines the inner bore of the stator.

The rotor 12 is shown as comprising the usual core 28 which is of magnetic material and is preferably laminated. The core 28 is rigidly secured to the shaft 14 and has partially closed slots 30 circumferentially spaced about its periphery. Extending lengthwise of the core 28 in the slots 30 are the squirrel cage conductors or bars 32. Both ends of the bars 32 are joined by brazing or other suitable means in conducting relation with end rings 34. A core retainer 36 is provided at each end in the form of a ring which surrounds and is secured to the shaft in any suitable manner and abuts the laminations of the rotor core 28 so as to retain the core laminations in position. The rotor 12 as well as the stator 16 should be sealed in motors of the type where liquid is admitted to the interior thereof since the liquid may have a harmful effect if permitted to enter the windings and laminations of the rotor. Therefore, a relatively thin metal cylinder 38 surrounds and abuts the rotor core. The cylinder 38 extends lengthwise beyond the ends of the core and is sealed to an end ring 40 at each end which is rigidly secured to the shaft in sealing engagement therewith.

The rotor bars in this type of machine fit tightly in the partially closed slots 30 and normally engage a shoulder 39 formed by the underside of the closed portion of the slots. The end rings 34 and rotor bars 28 may be of copper or other suitable conducting material which has a much higher coefficient of thermal expansion than the electrical steel of the core laminations 28. Thus, when the machine is operating at high temperature, the end rings 34 have greater radial expansion at a given temperature than does the core 28. Thus bars in conventional rotor constructions are radially restrained in the partially closed slots but are forced outward at the ends where they are connected to the end rings 34. Thus, high bending stresses are produced which must be taken up in the short length of bar between the end ring 34 and the core 28. These high bending stresses often result in damage to the bars. According to the construction of this invention, each bar 32 is relieved in the slot by providing transverse slots 44 in the bar. Each rotor bar 32 has a transverse slot 44 extending from each end to a point adjacent the center of the bar. Thus, an unslotted central portion 46 remains in each bar. The bars are then clamped down at their ends to close the slots at the end ring 34. They are retained in this position by brazing or other suitable means. This provides a tapered clearance radially of the slot from each end of the bar 32 to the end of the transverse slot 44 at the central portion 46 of the bar. Thus, sufficient clearance is provided at the ends of the bars to reduce the stress produced when the end ring 34 expands radially relative to the core 28.

It is thus apparent that a simple way of reducing stresses in rotor bars 32 due to the difference in coefficient of thermal expansion between the end ring 34 and the core 28 has been provided which permits present rotor designs to operate at higher temperatures. The tapered radial clearance in the slots permits the bars to flex in the slots when the end rings expand radially and, since the clearance extends over a substantial part of the length of the bar, the stress in the bar is greatly reduced as compared to conventional constructions in which the bar is restrained against any radial movement in the slot.

The method of providing this clearance is economical and effective. The laminations of the rotor core 28 are stacked in the usual manner and the rotor bar slots 30 are then aligned to receive the rotor bars 32. The laminations may be secured or positioned by press stacking or other suitable means. Slots 44 are then machined by any suitable means and the bars 32 are driven into the partially closed slots 30 of the core 28. The rotor bars 32 are compressed downwardly at the ends and are brazed or retained in that position so that the slot 44 in each bar is closed at the ends of the bar 32, where the bars 32 are connected to the rings 34, and tapers gradually from the center of the bar to the closed end as shown in the drawing. The bars 32 may be compressed and brazed before driving into the slots if desired. The rings 34 are then placed on the ends of the bars 32 and brazed or otherwise connected to them.

It should now be apparent that an improved rotor construction for a dynamoelectric machine has been provided in which the stress in the rotor bars due to radial expansion of the end rings relative to the rotor core is reduced by relieving the bar in the slot for a substantial distance. Thus, a dynamoelectric machine which is capable of operating at increased temperatures has been provided. The new rotor construction is of very simple and economical construction.

A particular embodiment of the invention has been shown and described for the purpose of illustration, but it will be apparent that various other embodiments are possible within the scope of the invention. Thus, for example, in accordance with the broader aspects of the invention, any squirrel cage winding may be constructed in this manner and the invention is not necessarily limited to a canned motor. Similarly, numerous other modifications and embodiments will be apparent to those skilled in the art and all such modifications and embodiments are within the scope of the invention.

We claim as our invention:

1. A rotor for a dynamoelectric machine comprising a cylindrical core of magnetic material, said core having circumferentially spaced, axially extending slots partially closed about its periphery, a plurality of conducting bars received in said slots and substantially filling said slots, a ring of conducting material secured to the conducting bars at each end of the core for electrically connecting the conducting bars, said bars being formed to provide a tapered clearance between the top of said slots and the adjacent portion of said bars extending from points adjacent the central portion of each bar toward the ends of the rotor.

2. A rotor for a dynamoelectric machine comprising a cylindrical core of magnetic material, said core having circumferentially spaced, axially extending slots about its periphery, a plurality of conducting bars received in said slots and substantially filling said slots, an end ring secured to the conducting bars at each end of the core for electrically connecting the conducting bars, each of said conducting bars having a transverse slot formed therein at each end extending from a point on the bar adjacent the central portion to the end of the bar, said transverse slot being compressed to closed position at the connection between said conducting bars and said end rings to provide an upper bar surface tapering from each end toward the central portion of the bar, whereby clearance for expansion and relief of stress due to the difference in the coefficient of expansion between core material and the end ring material is obtained.

3. In a dynamoelectric machine, a rotor comprising a core having a plurality of partially closed slots, rotor bars received in and substantially filling said slots, end rings at each end of the core for connecting the rotor bars, said core having a coefficient of expansion different from the coefficient of expansion of said end rings, each of said rotor bars having a transverse slot formed therein at each end extending from a point on the bar adjacent the central portion to the end of the bar, said slot being compressed to closed position at the connection between said rotor bars and said end rings to provide an upper bar surface clearance tapering from each end toward the central portion of the bar whereby clearance for expansion and relief of stress due to the difference in the coefficient of expansion between the core material and the end ring is obtained.

References Cited in the file of this patent

UNITED STATES PATENTS

| | | |
|---|---|---|
| 995,469 | Knight | June 20, 1911 |
| 1,068,757 | Garcelon | July 29, 1913 |
| 2,458,237 | Arnemo | Jan. 4, 1949 |